United States Patent Office 3,515,720
Patented June 2, 1970

3,515,720
ESTERS OF TESTOSTERONE AND SELECTED DERIVATIVES THEREOF WITH BICYCLO[2.2.2]OCTANE-1- AND -OCTENE-1-CARBOXYLIC ACIDS
Richard M. Scribner, Wilmington, Del., assignor to E. I. du Pont de Nemours and Company, Wilmington, Del., a corporation of Delaware
No Drawing. Continuation-in-part of application Ser. No. 579,515, Sept. 15, 1966. This application Nov. 5, 1968, Ser. No. 773,629
Int. Cl. C07c 173/00, 169/22
U.S. Cl. 260—239.55                              19 Claims

ABSTRACT OF THE DISCLOSURE

Described are the novel esters of certain 3 keto steroids, in which the C–17 substituent has the formula

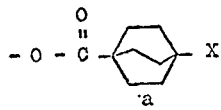

wherein $a$ can be either a single or a double bond or an epoxy group; and X can be hydrogen, a lower alkyl, isoalkyl, or trifluoromethyl, and in some cases also lower alkoxy, halogen, or the cyano group. These new esters have a high ratio of anabolic to androgenic activity and are useful as inhibitors of pituitary gonadotrophin.

CROSS-REFERENCE TO RELATED APPLICATIONS

This application is a continuation-in-part of my copending application Ser. No. 579,515, filed Sept. 15, 1966, as a continuation-in-part of my application Ser. No. 494,941, filed Oct. 11, 1965, both now abandoned.

BACKGROUND OF THE INVENTION

Field of the invention

This invention relates to certain physiologically active testosterone esters of the bicyclo[2.2.2]octane-1-carboxylic acids and their corresponding 2-octene and 2,3-epoxide derivatives.

Description of the prior art

So far as is known the compounds of the present invention are new and have not been disclosed in the chemical literature. The following references are of interest, however, with respect to the general topic of physiologically active testosterone esters:

(1) U.S. Pat. 2,785,189, entitled 19-Nor-Delta-4-Androstene, 3-One, 17 Beta Hexahydro Benzoate and Method for Manufacturing Same issued Mar. 12, 1957, to Hicks which discloses testosterone esters containing the group

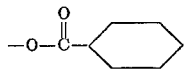

in the 17-position.

(2) U.S. Pat. 3,261,852, entitled Adamantoate Esters of Testosterone issued July 19, 1966, to Rapala which discloses testosterone esters containing the group

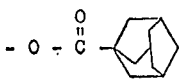

in the 17-position.

SUMMARY AND DETAILS OF THE INVENTION

The novel steroid esters of the present invention may be represented by the following formula

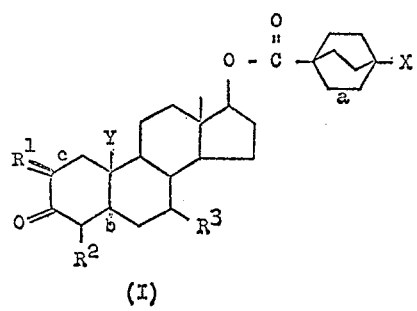

(I)

wherein $a$ is a single or a double carbon-carbon bond or an epoxy group between the 2- and 3-positions of the acid portion of the ester of Formula I;

$b$ is a single or a double carbon-carbon bond between the 4- and 5-positions of the steroid compound of Formula I;

$c$ is a single or a double carbon-carbon bond between the 1- and 2-positions of the steroid compound of Formula I;

X is hydrogen, n-alkyl or isoalkyl of up to 6 carbon atoms, n-alkoxy of 1–6 carbon atoms, trifluoromethyl, halogen (fluorine, chlorine, bromine or iodine) or cyano when $a$ is a single bond;

X is hydrogen, n-alkyl or isoalkyl of up to 6 carbon atoms or trifluoromethyl when $a$ is a double bond; and Y is hydrogen or methyl, all of the foregoing being subject to the following provisos:

(1) When $b$ is a double bond and $c$ is a single bond, $R^1$ is hydrogen, $R^2$ is hydrogen, chlorine or lower alkyl of up to 3 carbon atoms and $R^3$ is hydrogen or lower alkyl of up to 3 carbon atoms; with the further provisos that only one of the groups $R^2$ and $R^3$ can be substituted at any one time and that any R substituent singly bonded to a saturated steroid ring carbon atom is of the $\alpha$ configuration;

(2) When $b$ is a single bond and $c$ is a single bond, $R^1$ is two hydrogens, hydrogen and a lower alkyl of up to 3 carbon atoms or hydroxy-methylene (=CHOH), $R^2$ is hydrogen or lower alkyl of up to 3 carbon atoms and $R^3$ is hydrogen; with the further provisos that only one of the groups $R^1$ and $R^2$ can be substituted at any one time, that any R substituent singly bonded to a saturated steroid ring carbon is of the $\alpha$ configuration and that the hydrogen in the 5 position is of the $\alpha$ configuration; and (3) When $c$ is a double bond, $b$ is a single bond, $R^1$ is lower alkyl of up to 3 carbon atoms, $R^2$ and $R^3$ are each hydrogen and the hydrogen in the 5-position is of the $\alpha$ configuration.

The term "lower alkyl" as used in the preceding definition is defined as meaning that the alkyl groups contain 1–3 carbon atoms, inclusive. Preferably the lower alkyl groups are methyl.

A preferred group of X substituents in those compounds of this invention where $a$ is a single bond include hydrogen, methyl, trifluoromethyl, methoxy, chloro, and cyano. A more preferred class of X groups are those present when $a$ is a double bond, especially methyl, or hydrogen. An especially preferred class of X groups is that wherein X is hydrogen or n-alkyl or isoalkyl of 1-4 carbons, especially methyl.

Preferred testosterone components of the esters of this invention include 10-nor-testosterone, 4-chlorotestosterone, 7α - methyl-19-nor-testosterone, 5α-dihydro-19-nor-testosterone, and 2-hydroxymethylene-5α-dihydrotestosterone. Especially preferred is 19-nor-testosterone and 7α-methyl-19-nor-testosterone.

The foregoing preferred groups and components are preferred for reasons of availability of starting materials and/or on the basis of enhanced physiological properties.

The foregoing definition can, for simplification and convenience, be resolved into several subclasses of compounds according to the substituents on the testosterone moiety of the ester. Thus, the esters of this invention include those represented by the formulas listed in Table I, it being understood that for the entries in Table I X, $a$, $b$, lower alkyl and Y are as previously defined and $R^4$ is

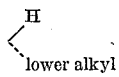

or =CHOH.

TABLE I

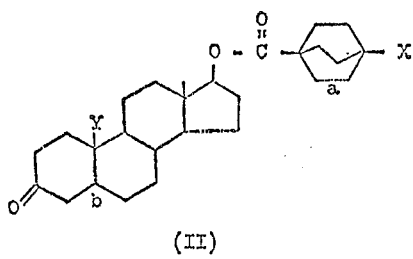

(II)

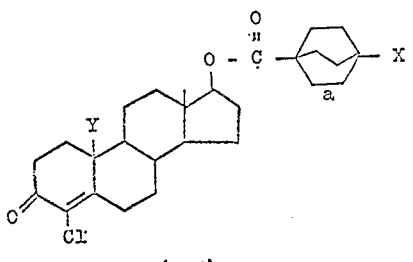

(III)

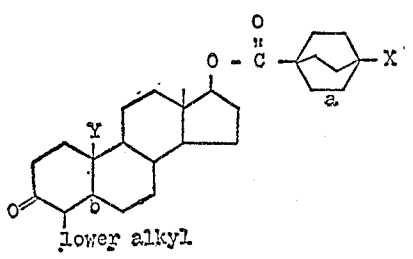

(IV)

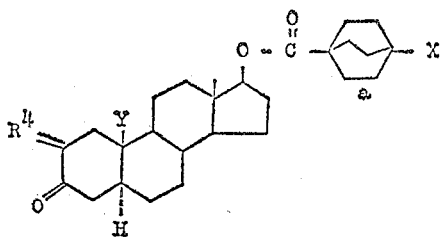

(V)

TABLE I—Continued

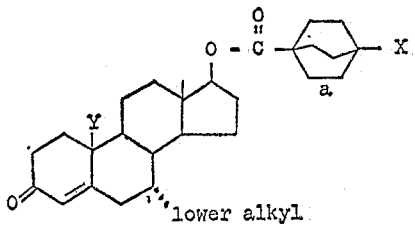

(VI)

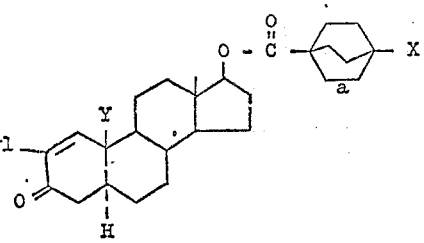

(VII)

A preferred class of testosterone esters of this invention can be represented by the formula

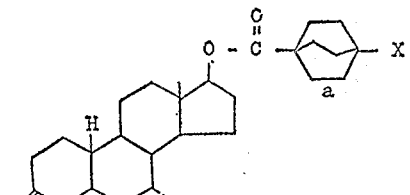

(VIII)

wherein X, $a$, $b$ and $R^3$ are as defined previously.

As can be seen, the steroids from which the esters of this invention are prepared can be classed as testosterones, 19 - nor - testosterones, 5α-dihydrotestosterones and 5α-dihydro-19-nor-testosterones. For purposes of the discussion herein these compounds will be referred to as "testosterones."

Representative testosterones used herein include those listed in Table II.

TABLE II 19-nor-testosterone
7α-methyl-19-nor-testosterone
5α-dihydro-19-nor-testosterone
testosterone
4-chlorotestosterone
5α-dihydrotestosterone
2α-methyl-5α-dihydrotestosterone
2-hydroxymethylene-5α-dihydrotestosterone
4-chloro-19-nor-testosterone
4-methyltestosterone
4-methyl-19-nor-testosterone
2α-methyl-5α-dihydro-19-nor-testosterone
4α-methyl-5α-dihydrotestosterone
4α-methyl-5α-dihydro-19-nor-testosterone
7α-methyltestosterone
2-methyl-Δ¹-5α-dihydrotestosterone
2-methyl-Δ¹-5α-dihydro-19-nor-testosterone.

According to the present invention the biological activity of the various testosterones enumerated in Table II can be modified and enhanced by forming an ester of such with bicyclo[2.2.2]octane-, or -oct-2-ene-, 1-carboxylic acids and derivatives thereof of the following structure:

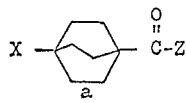

(IX)

wherein X and a are defined as above, and Z is halogen (preferably chlorine or bromine), —OR⁵ wherein R⁵ is lower alkyl,

wherein R⁶ is lower alkyl or

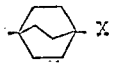

or —OH.

Thus the esterification of the testosterone alcohols includes
(a) Esterification with an acid, i.e., a reactant of Formula IX wherein Z is —OH;
(b) Esterification with an acyl halide, i.e., a reactant of Formula IX wherein Z is halogen;
(c) Esterification with an anhydride, i.e., a reactant of Formula IX wherein Z is

or
(d) Esterification by alcoholysis of an ester, i.e., a reactant of Formula IX wherein Z is —OR⁵.

The esterification by method (a) may be carried out by heating the two reactants in the presence of an esterification catalyst, and there may be used an acidic catalyst such as sulfuric acid, hydrochloric acid, an arylsulfonic acid or boron trifluoride. Pressure is not critical in this procedure, and atmospheric pressure is preferred. Normally an excess of one or the other of the reactants is employed to shift the equilibrium of the reaction in favor of the ester. Suitable solvents include benzene, xylene, dioxane, tetrahydrofuran, diethyl ether, chloroform, hexane and the like. The reaction can be carried out at temperatures of between about 25–100° C., with temperatures toward the higher limit being preferred.

Esterification by method (b) is carried out at temperatures of from about 20° C. to about 150° C. in an inert solvent and in the presence of an acid acceptor. Suitable solvents include hydrocarbons such as benzene or hexane, ethers such as dioxane, tetrahydrofuran, or diethyl ether, and halohydrocarbons such as chloroform. Suitable acid acceptors include the tertiary hydrocarbyl amines such as trimethylamine, triethylamine or pyridine. In some instances, e.g. with pyridine, the acid acceptor can also serve as the solvent. Pressure is not critical, and the reaction may be carried out at atmospheric pressure. This method is preferred.

The esterification conditions for method (c) are, in general, the same as for method (b).

Esterification by method (d) is ordinarily carried out at reflux temperatures. In this reaction the alcohol formed, R⁵OH, must be lower boiling than the reactants or solvents in order that it be removed by distillation. The reaction is carried out in the presence of an acid catalyst such as sulfuric acid, p-toluenesulfonic acid and the like. A solvent is not necessary, but if one is employed it should be a high boiling one to facilitate removal of the R⁵OH formed. Hydrocarbons such as toluene or xylene, ethers such as tetrahydrofuran and the like can be used as suitable solvents. Pressure is not critical, and atmospheric pressure is most conveniently employed.

In certain instances it may be preferable to modify the steroid nucleus or the acid portion of the ester after the aforementioned esterification has been accomplished. This approach is practicable because of the marked resistance toward hydrolysis of the resulting esters. For example, esters of this invention where the steroid moiety is derived from dihydrotestosterone can be reacted with sodium hydride followed with ethyl formate to obtain esters wherein R⁴ (or R¹) is hydroxymethylene (=CHOH). And when the acid portion of the ester is a bicyclo[2.2.2] oct-2′-ene-1′-carboxylic acid the corresponding epoxide may be prepared by treating the ester with any of the commonly used epoxidizing agents such as m-chloroperbenzoic acid.

EMBODIMENTS OF THE INVENTION

There follow some nonlimiting examples illustrative of the present invention. Unless otherwise specified all temperatures are in ° C. and pressures are expressed in mm. of mercury.

EXAMPLE 1

19-nor-testosterone bicyclo[2.2.2]octane-1′-carboxylate

Twenty-five grams of bicyclo[2.2.2]octane-1-carboxylic acid were mixed with 35 ml. of thionyl chloride and one drop of dimethylformamide in 50 ml. of benzene and heated at reflux temperature for one hour. Excess thionyl chloride was removed under water aspirator pressure, and the residue was distilled, giving 23.6 g. of bicyclo[2.2.2] octane-1-carboxylic acid chloride, B.P. 78° C./3.5 mm.

A solution of 2.7 g. of 19-nor-testosterone and 2.2 g. of bicyclo[2.2.2]octane-1-carboxylic acid chloride in 15 ml. of pyridine was stirred for 4 days at room temperature and then poured into water. Extraction with ether and chromatography on 150 g. of neutral, activity III alumina gave, in the benzene-petroleum ether (1:1) eluate, after crystallization from acetone-hexane, 1.62 g. of 19-nor-testosterone bicyclo[2.2.2]octane-1′-carboxylate, M.P. 148.5–150° C.; $\alpha_D^{23}$ +56° (c. 1.0, CHCl₃)

$\lambda_{max.}^{EtOH}$ 239 mμ ($\epsilon$=16,600)

*Analysis.*—Calcd. for C₂₇H₃₈O₃ (percent): C, 78.98; H, 9.33. Found (percent): C, 78.88; H, 9.43.

EXAMPLE 2

19-nor-testosterone 4′-methylbicyclo[2.2.2]octane-1′-carboxylate

A solution of 8.5 g. of 4-methylbicyclo[2.2.2]octane-1-carboxylic acid, 20 ml. of thionyl chloride, and two drops of dimethylformamide in 50 ml. of benzene was heated at reflux temperature for 3 hours. Distillation gave 8.1 g. of 4-methylbicyclo[2.2.2]octane-1-carboxylic acid chloride, B.P. 56° C./0.9 mm.

A solution of 5 ml. of the above acid chloride and 5 g. of 19-nor-testosterone in 35 ml. of pyridine was stirred for 4 days at room temperature and then poured into water and extracted with ether. The ether was washed, dried and evaporated. Chromatography of the residue on 300 g. of neutral, activity III alumina gave on elution with petroleum ether-benzene (1:1) 4.68 g. of 19-nor-testosterone 4-methylbicyclo[2.2.2]octane-1′-carboxylate, M.P. 196–201°C. after crystallization from acetone-hexane.

*Analysis.*—Calcd. for C₂₈H₄₀O₃ (percent): C, 79.20; H, 9.50. Found (percent): C, 79.23; H, 9.50.

EXAMPLE 3

19-nor-testosterone bicyclo[2.2.2]oct-2′-ene-1′-carboxylate

A solution of 26.3 g. of bicyclo[2.2.2]oct-2-ene-1-carboxylic acid, 35 ml. of thionyl chloride, and 3 drops of dimethylformamide in 50 ml. of benzene was heated at reflux temperature for 2 hours. The mixture was fractionally distilled, giving 24.5 g. of bicyclo[2.2.2]oct-2-ene-1-carboxylic acid chloride, B.P. 48–49° C./0.9 mm.

A solution of the above acid chloride (5 ml.) and 5.0 g. of 19-nor-testosterone in 35 ml. of pyridine was stirred at room temperature for 4 days and then poured into 300 ml. of water. Extraction with ether, followed by washing of the ether with 5% aqueous sodium bicarbonate and 5% hydrochloric acid, gave 9.7 g. of crude product on evaporation of the ether. Chromatography of this product on 300 g. of neutral, activity III alumina gave in the benzene-petroleum ether (1:1) eluate 2.05 g. of pure 19-nor-testosterone bicyclo[2.2.2]oct - 2' - ene - 1' - carboxylate, M.P. 143–147° C. (acetone-hexane);

$\lambda_{max.}^{CHCl_3}$ 1710, 1660, 1610 (weak), 1250, 1040 cm.$^{-1}$

*Analysis.*—Calcd. for $C_{27}H_{36}O_3$ (percent): C, 79.37; H, 8.88. Found (percent): C, 79.48; H, 8.90.

EXAMPLE 4

19-nor-testosterone 4'-methylbicyclo[2.2.2]oct-2'-ene-1'-carboxylate

A mixture of 25 g. of 4-methylbicyclo[2.2.2]oct-2-ene-1-carboxylic acid, 35 ml. of thionyl chloride, and one drop of dimethylformamide in 50 ml. of benzene was heated at reflux temperature for two hours. Fractional distillation of the reaction mixture gave 18.2 g. of 4-methyl-bicyclo[2.2.2]oct-2-ene-1-carboxylic acid chloride, B.P. 74° C./1.5 mm.

A solution of 4.0 ml. of the above acid chloride, 5.0 g. of 19-nor-testosterone, and 4.0 ml. of pyridine in 125 ml. of anhydrous benzene was heated at reflux temperature for eight hours. The mixture was cooled, diluted with ether, and washed twice with cold, 5% aqueous sodium hydroxide, once with water, and then with saturated sodium chloride solution. Evaporation of the ether gave 9.3 g. of crude ester, which was applied as a solution in benzene to a column of 200 g. of neutral, activity grade III alumina and eluted with benzene. Crystallization from acetone-hexane gave 4.2 g. of the 4-methylbicyclo[2.2.2]oct-2-ene-1-carboxylic acid ester of 19-nor-testosterone, M.P. 179–183° C.; $[\alpha]_D^{24}$ +66° (c.=1.20, CHCl$_3$);

$\lambda_{max.}^{EtOH}$ 238 m$\mu$ ($\epsilon$ =17,900); $\lambda_{max.}^{CHCl_3}$ 5.83, 6.03, 6.20, 800$\mu$

*Analysis.*—Calcd. for $C_{28}H_{38}O_3$ (percent): C, 79.58; H, 9.06. Found (percent): C, 79.74; H, 9.03.

EXAMPLE 5

19-nor-testosterone 4'-isopropylbicyclo[2.2.2]oct-2'-ene-1'-carboxylate

The subject compound was prepared by repetition of the general procedure of Example 4 except that 4-isopropylbicyclo[2.2.2]octene-1-carboxylic acid was used in place of 4 - methylbicyclo[2.2.2]oct - 2-ene-1-carboxylic acid. The former acid was converted to its acid chloride (B.P. 73° C./0.3 mm.). The acid chloride was then reacted with 19-nor-testosterone giving the 4-isopropylbicyclo[2.2.2]oct-2-ene-1-carboxylic acid ester of 19-nor-testosterone as needles, M.P. 204–206.5° (after crystallization from acetone); $[\alpha]_D^{24}$ +57 (c.=1.20, CHCl$_3$); and $\lambda_{max.}^{CHCl_3}$ 1720, 1665, 1615, 1250 cm.$^{-1}$

*Analysis.*—Calcd. for $C_{30}H_{44}O_3$ (percent): C, 79.60; H, 9.80. Found (percent): C, 79.58; H, 10.14.

The corresponding 19-nor-testosterone 4'-isopropylbicyclo[2.2.2]octane - 1 - carboxylate is obtained by hydrogenation of the 4-isopropylbicyclo[2.2.2]octene-1-carboxylic acid.

EXAMPLE 6

19-nor-testosterone 2',3'-epoxy-4'-methylbicyclo[2.2.2]oct-2'-ene-1'-carboxylate 19-nor-testosterone 4' - methylbicyclo[2.2.2]oct-2-ene-1' - carboxylate (2.1 g.) in 75 ml. of CH$_2$Cl$_2$ was stirred while a solution of 1.0 g. of 85% m-chloroperbenzoic acid in 20 ml. of CH$_2$Cl$_2$ was added dropwise over 10 minutes. After 24 hours at room temperature, the reaction mixture was washed with 10% sodium bicarbonate solution several times, dried and evaporated. Chromatography of the residue on 60 g. of neutral, activity III alumina gave in the benzene eluate 0.46 g. of 19-nor-testosterone 2',3'-epoxy-4'-methylbicyclo[2.2.2]oct-2' - ene - 1'-carboxylate, which after crystallization from cyclohexane had M.P. 229–232°; $[\alpha]_D^{23}$ +57° (c.=0.6, CHCl$_3$)

$\lambda_{max.}^{EtOH}$ 240 m$\mu$ ( $\epsilon$ =17,300); $\lambda_{max.}^{CHCl_3}$ 3.28, 3.39, 3.47, 5.81, 6.02, 6.19, 7.25, 7.95$\mu$

*Analysis.*—Calcd. for $C_{28}H_{38}O_4$ (percent): C, 76.69; H, 8.73. Found (percent): C, 76.91; H, 8.68.

When the reaction of Example 6 is run using other of the octene-esters of this invention as starting materials, e.g. the compounds of Examples 3 and 5, the corresponding 2',3'-epoxy derivatives are produced.

The bicyclo[2.2.2]octane - 1 - carboxylic acids and bicyclo[2.2.2]oct - 2 - ene - 1 - carboxylic acids and the alkyl esters of either can be prepared as described by J. D. Roberts, W. T. Moreland and W. Frazer, J. Am. Chem. Soc., 75, 637 (1953); H. D. Holtz and L. M. Stock, J. Am. Chem. Soc., 86, 5183 (1964); J. C. Kauer, R. E. Benson and G. W. Parshall, J. Org. Chem., 30, 1431 (1965); Grob, Ohta, Renk and Weiss, Helv. Chim. Acta, 41, 1191 (1958); U.S. Pat. 3,081,334 issued to J. C. Kauer and in copending patent applications of J. C. Kauer, Ser. No. 460,820 filed June 2, 1965 now U.S. Pat. No. 3,419,598 and Ser. No. 460,812 filed June 2, 1965, now abandoned.

Esters obtained in the foregoing procedures can be converted, if desired, to the corresponding acids by hydrolysis using acid or basic catalysts. It is most convenient to saponify the esters by refluxing with alcoholic potassium hydroxide or sodium hydroxide followed by acidification of the reaction mixture.

The acid halide derivatives of the bicyclo carboxylic acids obtained in the foregoing two paragraphs can be obtained by procedures described in Wagner and Zook, "Synthetic Organic Chemistry," Wiley and Sons, Inc., N.Y., 1963, page 546.

Representative compounds of this invention that are prepared by the procedures described above include those listed in Table III.

TABLE III 19-nor-testosterone 4'-bromobicyclo[2.2.2]octane-1'-carboxylate 19-nor-testosterone 4'-trifluoromethylbicyclo[2.2.2]octane-1'-carboxylate 19-nor-testosterone 4'-methoxybicyclo[2.2.2]octane-1'-carboxylate 19-nor-testosterone 4'-cyanobicyclo[2.2.2]octane-1'-carboxylate 19-nor-testosterone 4'-n-propylbicyclo[2.2.2]octane-1'-carboxylate 4-chlorotestosterone 4'-methylbicyclo[2.2.2]oct-2'-ene-1'-carboxylate Testosterone 4'-methylbicyclo[2.2.2]oct-2'-ene-1'-carboxylate 2α-methyl-5α-dihydrotestosterone 4'-methylbicyclo[2.2.2]oct-2'-ene-1'-carboxylate 7α-methyl-19-nor-testosterone bicyclo[2.2.2]oct-2'-ene-1'-carboxylate 2-hydroxymethylene-5α-dihydrotestosterone 4'-methylbicyclo[2.2.2]oct-2'-ene-1'-carboxylate 4α-methyl-5α-dihydrotestosterone 4'-methylbicyclo[2.2.2]oct-2'-ene-1'-carboxylate 2-methyl-Δ$^1$-5α-dihydrotestosterone 4'-methylbicyclo[2.2.2]oct-2'-ene-1'-carboxylate 5α-dihydrotestosterone 4'-methylbicyclo[2.2.2]oct-2'-ene-1'-carboxylate 5α-dihydro-19-nor-testosterone 4'-methylbicyclo[2.2.2]-oct-2'-ene-1'-carboxylate A representative preparation of, for example, 4-methyl-bicyclo[2.2.2]oct-2-ene-1-carboxylic acid is given as follows. A charge of 53 g. of ethyl 6-methyl-α-pyrone-3-carboxylate [J. Gen. Chem., U.S.S.R., 28, 1562, 2438 (1958)], 1 g. of hydroquinone, and 80 ml. of benzene is heated in a pressure vessel with ethylene at 3000 atmospheres at a maximum temperature of 180° C. for approximately 10 hours. The pressure vessel is cooled, the gaseous contents carefully vented, benzene removed, and the liquid product distilled to give ethyl 4-methylbicyclo[2.2.2]oct-2-ene-1-carboxylate, B.P. 82° C./3.8 mm., $n_D^{25}$ 1.4662. Refluxing with methanolic sodium hydroxide followed by acidification gives 4-methylbicyclo[2.2.2]oct-2-ene-1-carboxylic acid.

Hydrogenation of the acid obtained or the corresponding ester, over palladium-on-charcoal catalyst or platinum catalyst at 10–40 p.s.i. of hydrogen, gives the corresponding 4 - methylbicyclo[2.2.2]octane-1-carboxylic acid or ester. These in turn can be converted either before or after hydrogenation to the acid chlorides or anhydrides to give any of the esterification reactants used in the processes described previously.

For example, the ethyl 4 - methylbicyclo[2.2.2]oct-2-ene-1-carboxylate, obtained above, is mixed with an equimolar amount of 19-nor-testosterone in the presence of a catalytic amount of p-toluenesulfonic acid in a xylene medium, and heated at reflux temperatures for 24 hours to remove ethanol by fractional distillation, to produce 19 - nor-testosterone 4'-methylbicyclo[2.2.2]oct-2'-ene-1'-carboxylate. Alternatively, the ethyl 4-methylbicyclo-[2.2.2]oct-2-ene-1-carboxylate can be saponified to the acid and the acid refluxed with an excess of 19-nor-testosterone in the presence of a catalytic amount of p-toluenesulfonic acid to produce an ester of this invention.

The esters of this invention possess useful biological properties of distinct medical significance and thus represent a marked advance over the prior art. As anabolic agents, androgenic agents, anti-estrogenic agents and as inhibitors of pituitary gonadotrophin, the compounds of this invention show pronounced activity. For example, with respect to their anabolic properties, these esters show superior anabolic (or myogenic) potency, superior separation of anabolic from androgenic activity or superior duration of activity when compared to the corresponding testosterone alcohols or their previously known esters. These conclusions are based on biological assays of which the following are typical.

Castrate male rats, 21 days of age at the start of the testing, were injected subcutaneously once daily for 14 days with testosterone esters dissolved in sesame oil. On the day following the last injection, the rats were autopsied and weights of ventural prostrate (VP) and seminal vesicles (SV) were measured as androgen indicators, the weights of levator ani muscles being measured as myogenic (androgenic) indicators. At dose levels of 0.25 mg. per day, the esters indicated in Table IV gave the results shown. These results demonstrate the excellent separation of myogenic from androgenic activity produced by the esters of this invention, superior even to that of 19-nor-testosterone hexahydrobenzoate.

TABLE IV

| Ester | VP (mg.) | SV (mg.) | LA (mg.) |
|---|---|---|---|
| Controls (sesame oil only) | 15 | 16 | 48 |
| 19-nor-testosterone hexahydrobenzoate | 73 | 80 | 114 |
| 19-nor-testosterone bicyclo[2.2.2]-oct-2'-ene-1'-carboxylate | 44 | 44 | 134 |
| 19-nor-testosterone 4'-methyl-bicyclo[2.2.2]oct-2'-ene-1'-carboxylate | 40 | 31 | 109 |
| 19-nor-testosterone 4'-methyl-bicyclo[2.2.2]octane-1'-carboxylate | 32 | 30 | 111 |

From a similar 14-day assay run at 2–3 dose levels for each compound, relative potencies compared to testosterone propionate were calculated as well as ratios of myogenic potency to androgenic potency. These data, given in Table V, show that esters of this invention exhibit outstanding myogenic potencies compared to previously known anabolic steroids.

TABLE V

| Compound | Dose range in mg. | Percent relative potency VP | SV | LA | Myogenic/androgenic ratio, LA/VP |
|---|---|---|---|---|---|
| Testosterone | 0.1–0.5 | 12 | 10 | 17 | 1.4 |
| 19-nor-testosterone | 0.25–1.0 | 0.94 | 1.6 | 9.0 | 10 |
| 19-nor-testosterone adamantane 1'-carboxylate | 0.25–1.0 | 0.73 | 1.8 | 26 | 36 |
| 19-nor-testosterone bicyclo[2.2.2]octane-1'-carboxylate | 0.25–1.0 | 1.9 | 4.3 | 80 | 42 |
| 19-nortestosterone bicyclo[2.2.2]oct-2-ene-1'-carboxylate | 0.1–0.5 | 2.8 | 7.1 | 105 | 37 |
| 19-nor-testosterone 4'-methylbicyclo[2.2.2]octane-1'-carboxylate | 0.1–0.5 | 2.0 | 3.7 | 72 | 36 |

A third type of assay which has been useful in evaluating the superiority of the esters of this invention is based on the effects of a *single* injection of ester in 21-day-old castrate male rats. The treated animals were autopsied several weeks after the single injection, and the weights of the androgen indicators (VP, SV) and myogenic indicators (LA) were determined. Results from an autopsy done twelve weeks after injection are given in Table VI and demonstrate that the esters of this invention have an unusually long-lasting anabolic (myogenic) effect combined with a low level of androgenicity.

TABLE VI.—12 WEEKS POST TREATMENT

| Ester (dose) | VP, mg. | SV, mg. | LA, mg. |
|---|---|---|---|
| Control (sesame oil only) | 9.2 | 10.1 | 109.1 |
| 19-nor-testosterone phenylpropionate (7.5 mg.) | 24.6 | 48.8 | 164.6 |
| 19-nor-testosterone bicyclo[2.2.2]-oct-2'-ene-1'-carboxylate (7.5 mg.) | 15.2 | 43.3 | 301.9 |
| 19-nor-testosterone 4'-methylbicyclo-[2.2.2]octane-1'-carboxylate (7.8 mg.) | 16.7 | 38.7 | 250.2 |

As many apparently widely different embodiments of this invention may be made without departing from the scope and spirit thereof, it is to be understood that this invention is not limited to the specific embodiments described herein.

The embodiments of the invention in which an exclusive property or privilege is claimed are defined as follows:

1. The steroid compounds of the formula

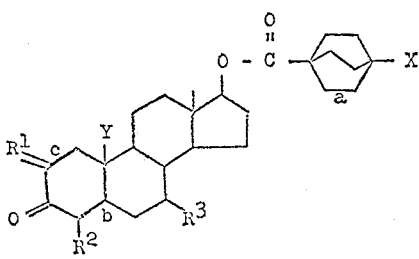

(I)

wherein

*a* is a single or a double carbon-carbon bond or an epoxy group between the 2- and 3-positions of the acid portion of the ester of Formula I;

*b* is a single or a double carbon-carbon bond between the 4- and 5-positions of the steroid compound of Formula I;

*c* is a single or a double carbon-carbon bond between the 1- and 2-positions of the steroid compound of Formula I;

X is hydrogen, n-alkyl or isoalkyl of up to 6 carbon atoms, n-alkoxy of 1-6 carbon atoms, trifluoromethyl, halogen (fluorine, chlorine, bromine or iodine) or cyano when *a* is a single bond;

X is hydrogen, n-alkyl or isoalkyl of up to 6 carbon atoms or trifluoromethyl when *a* is a double bond; and Y is a hydrogen or methyl, all of the foregoing being subject to the following provisos:

(i) when *b* is a double bond and *c* is a single bond, $R^1$ is hydrogen, $R^2$ is hydrogen, chlorine or lower alkyl of up to 3 carbon atoms and $R^3$ is hydrogen or lower alkyl of up to 3 carbon atoms; with the further provisos that only one of the groups $R^2$ and $R^3$ can be substituted at any one time and that any R substituent singly bonded to a saturated steroid ring carbon atom is of the α configuration;

(ii) when *b* is a single bond and *c* is a single bond, $R^1$ is two hydrogens, hydrogen and a lower alkyl of up to 3 carbon atoms or hydroxymethylene (=CHOH), $R^2$ is hydrogen or lower alkyl of up to 3 carbon atoms and $R^3$ is hydrogen; with the further provisos that only one of the groups $R^1$ and $R^2$ can be substituted at any one time, that any R substituent singly bonded to a saturated steroid ring carbon is of the α configuration and that the hydrogen in the 5-position is of the α configuration; and (iii) when *c* is a double bond, *b* is a single bond, $R^1$ is lower alkyl of up to 3 carbon atoms, $R^2$ and $R^3$ are each hydrogen and the hydrogen in the 5-position is of the α configuration.

2. The compounds of Formula I of claim 1 having the formula

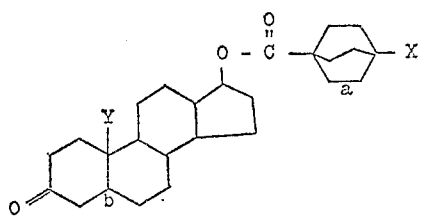

wherein Y, X, *a* and *b* are defined as in claim 1.

3. The compounds of claim 2 wherein X is hydrogen or methyl.

4. The compounds of Formula I of claim 1 having the formula

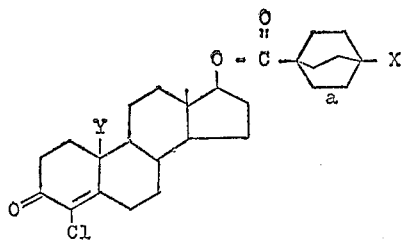

wherein Y, X and *a* are defined as in claim 1.

5. The compounds of claim 4 wherein X is hydrogen or methyl.

6. The compounds of Formula I of claim 1 having the formula

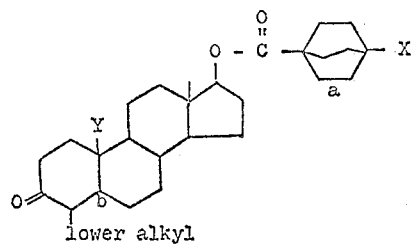

wherein X, Y, *a* and *b* are defined as in claim 1.

7. The compounds of claim 6 wherein X is hydrogen or methyl and the lower alkyl group is methyl.

8. The compounds of Formula I of claim 1 having the formula

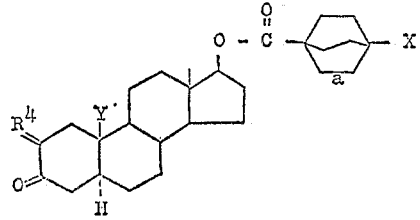

wherein X, Y and *a* are defined as in claim 1 and $R^4$ is

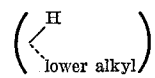

or (=CHOH).

9. The compounds of claim 8 wherein X is hydrogen or methyl and the lower alkyl group is methyl.

10. The compounds of Formula I of claim 1 having the formula

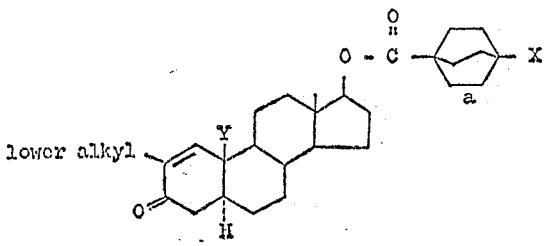

wherein X, Y and *a* are defined as in claim 1.

11. The compounds of claim 10 wherein X is hydrogen or methyl and the lower alkyl group is methyl.

12. The compounds of Formula I of claim 1 having the formula

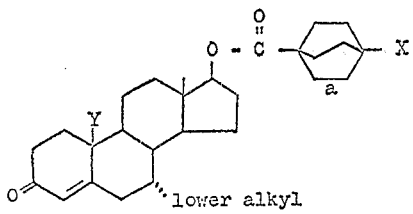

wherein X, Y and *a* are defined as in claim 1.

13. The compounds of claim 12 wherein X is hydrogen or methyl and the lower alkyl group is methyl.

14. The compound of Formula I of claim 1 having the name 19-nor-testosterone bicyclo[2.2.2]octane - 1' - carboxylate.

15. The compound of Formula I of claim 1 having the name 19-nor-testosterone 4'-methylbicyclo[2.2.2]octane-1'-carboxylate.

16. The compound of Formula I of claim 1 having the name 19-nor-testosterone bicyclo[2.2.2]oct-2'-ene-1'-carboxylate.

17. The compound of Formula I of claim 1 having the name 19-nor-testosterone 4' - methylbicyclo[2.2.2]oct-2'-ene-1'-carboxylate.

18. The compound of Formula I of claim 1 having the name 19-nor-testosterone 4' - isopropylbicyclo[2.2.2]oct-2'-ene-1'-carboxylate.

19. The compound of Formula I of claim 1 having the name 19-nor-testosterone 2',3' - epoxy-4'-methylbicyclo-[2.2.2]-oct-2'-ene-1'-carboxylate.

References Cited

UNITED STATES PATENTS

| 2,785,189 | 3/1957 | Hicks | 260—397.4 |
| 3,238,232 | 3/1966 | Borrevang | 260—397.4 |
| 3,261,852 | 7/1966 | Rapala | 260—397.4 |
| 3,316,152 | 4/1967 | Heider et al. | 167—65 |
| 3,359,261 | 12/1967 | Anner et al. | 260—239.55 |

HENRY A. FRENCH, Primary Examiner

U.S. Cl. X.R.

260—397.4, 999